United States Patent
Starner

(10) Patent No.: US 9,268,024 B1
(45) Date of Patent: Feb. 23, 2016

(54) EXPECTATION MAXIMIZATION TO DETERMINE POSITION OF AMBIENT GLINTS

(71) Applicant: Google Inc., Mountain View, CA (US)

(72) Inventor: Thad Eugene Starner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 796 days.

(21) Appl. No.: 13/632,098

(22) Filed: Sep. 30, 2012

Related U.S. Application Data

(60) Provisional application No. 61/584,099, filed on Jan. 6, 2012.

(51) Int. Cl.
| | | |
|---|---|---|
| *H04N 5/14* | (2006.01) | |
| *G01S 17/08* | (2006.01) | |
| *G06T 7/00* | (2006.01) | |
| *G01S 17/46* | (2006.01) | |
| *G02B 27/01* | (2006.01) | |

(52) U.S. Cl.
CPC .............. *G01S 17/08* (2013.01); *G01S 17/46* (2013.01); *G06T 7/0046* (2013.01); *G02B 2027/0178* (2013.01)

(58) Field of Classification Search
CPC ....... G01S 17/08; G01S 17/46; G06T 7/0046; G02B 27/017; G02B 2027/0178
USPC .................... 348/78; 382/103, 106
See application file for complete search history.

(56) References Cited

U.S. PATENT DOCUMENTS

| | | | |
|---|---|---|---|
| 6,299,308 B1 | 10/2001 | Voronka et al. | |
| 6,459,446 B1 | 10/2002 | Harman | |
| 6,659,611 B2 | 12/2003 | Amir et al. | |
| 7,809,160 B2 | 10/2010 | Vertegaal et al. | |
| 8,958,599 B1 * | 2/2015 | Starner | G06K 9/00604 382/103 |
| 2008/0002863 A1 * | 1/2008 | Northcott | A61B 3/1216 382/117 |
| 2010/0245093 A1 * | 9/2010 | Kobetski | A61B 5/18 340/576 |
| 2014/0354514 A1 * | 12/2014 | Aronsson | G06F 3/013 345/7 |

* cited by examiner

*Primary Examiner* — David Harvey
(74) *Attorney, Agent, or Firm* — McDonnell Boehnen Hulbert & Berghoff LLP

(57) ABSTRACT

Exemplary embodiments may involve analyzing reflections from an eye to help determine where the respective sources of the reflections are located. An exemplary method may involve: (a) analyzing eye-image data to determine observed movement of a reflected feature on a corneal surface; (b) determining an expected movement of the reflected feature on the corneal surface given a value of a z-distance parameter, wherein the value of the z-distance parameter is initially set at a first value; (c) determining a difference between the observed movement of the reflected feature on the corneal surface and the expected movement of the reflected feature on the corneal surface; (d) if the difference is less than a threshold, then associating the value of the z-distance parameter with a source of the reflected feature; and (e) if the difference is greater than the threshold, then: (i) making a predetermined adjustment to the value of the z-distance parameter; and (ii) repeating (a) to (d) with the adjusted value of the z-distance parameter.

21 Claims, 12 Drawing Sheets

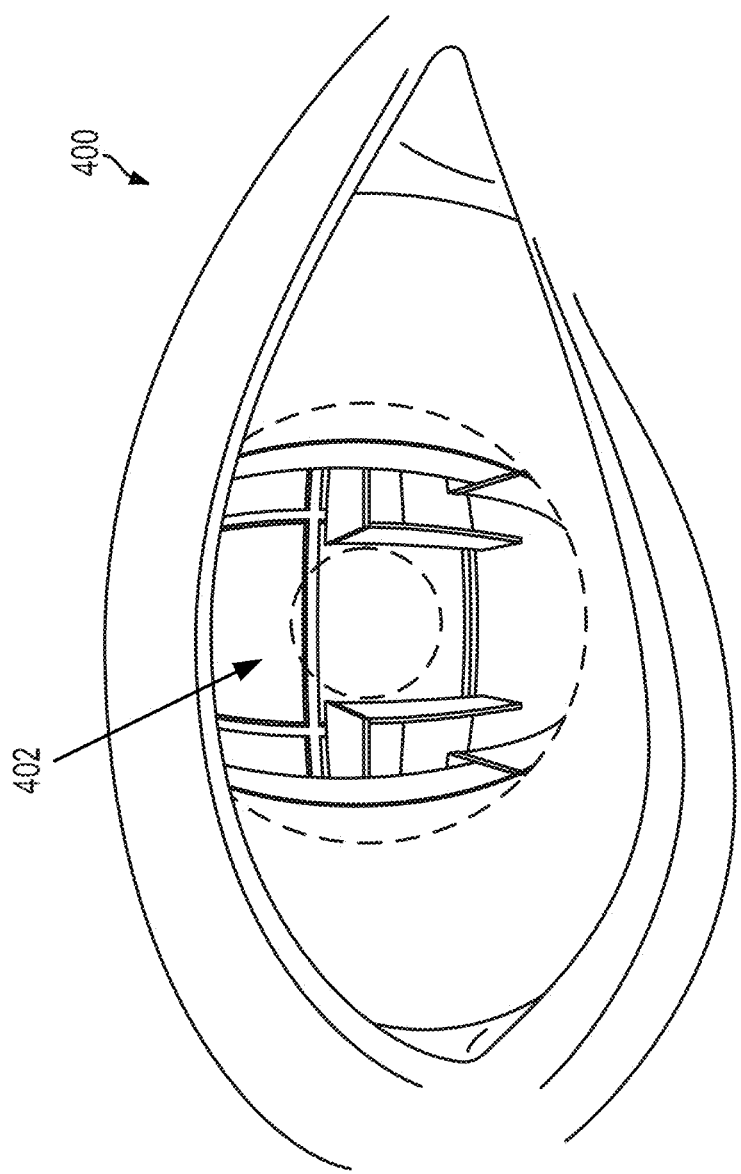

EXPECTATION MAXIMIZATION TO DETERMINE POSITION OF AMBIENT GLINTS

CROSS REFERENCE TO RELATED APPLICATION

This patent application claims priority to U.S. Application No. 61/584,099, filed Jan. 6, 2012, the contents of which are entirely incorporated herein by reference, as if fully set forth in this application.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" (HMDs). A head-mounted display places a graphic display or displays close to one or both eyes of a wearer. To generate the images on a display, a computer processing system may be used. Such displays may occupy a wearer's entire field of view, or only occupy part of wearer's field of view. Further, head-mounted displays may be as small as a pair of glasses or as large as a helmet.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming.

SUMMARY

In one aspect, an exemplary method may involve a computing device: (a) analyzing eye-image data to determine observed movement of a reflected feature on a corneal surface; (b) determining an expected movement of the reflected feature on the corneal surface given a value of a z-distance parameter, wherein the value of the z-distance parameter is initially set at a first value; (c) determining a difference between the observed movement of the reflected feature on the corneal surface and the expected movement of the reflected feature on the corneal surface; (d) if the difference is less than a threshold, then associating the value of the z-distance parameter with a source of the reflected feature; and (e) if the difference is greater than the threshold, then: (i) making a predetermined adjustment to the value of the z-distance parameter; and (ii) repeating (a) to (d) with the adjusted value of the z-distance parameter.

In another aspect, an exemplary system may include a non-transitory computer-readable medium and program instructions stored on the non-transitory computer-readable medium. The program instructions are executable by at least one processor to: (a) analyze eye-image data to determine observed movement of an ambient glint on a corneal surface; (b) determine an expected movement of the ambient glint on the corneal surface given a value of a z-distance parameter, wherein the value of the z-distance parameter is initially set at a default estimate value; (c) determine a difference between the observed movement of the ambient glint on the corneal surface and the expected movement of the ambient glint on the corneal surface; (d) if the difference is less than a threshold, then associate the value of the z-distance parameter with a source of the ambient glint; and (e) if the difference is greater than the threshold, then: (i) make a predetermined adjustment to the value of the z-distance parameter; and (ii) repeat (a) to (d) with the adjusted value of the z-distance parameter.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 4 illustrates an image 400 of a reflection from the cornea that exhibits warping due to the curvature of the corneal surface, according to an exemplary embodiment.

DETAILED DESCRIPTION

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. OVERVIEW

An exemplary embodiment may be implemented by or take the form of a head-mountable display (HMD), or a computing system that receives data from an HMD, such as a cloud-based server system. The HMD may include an inward-facing camera or cameras that are configured to capture images of the wearer's eye or eyes. The images of the wearer's eye may be video and/or still images, depending upon the particular implementation. Further, the cornea and/or the sclera may reflect light from the wearer's eye. Such reflections may therefore be captured in images of the wearer's eye. Since the eye typically reflects an image of what the wearer is viewing, reflections captured in images of the eye may be indicative of what the wearer is looking at.

Figure 1:
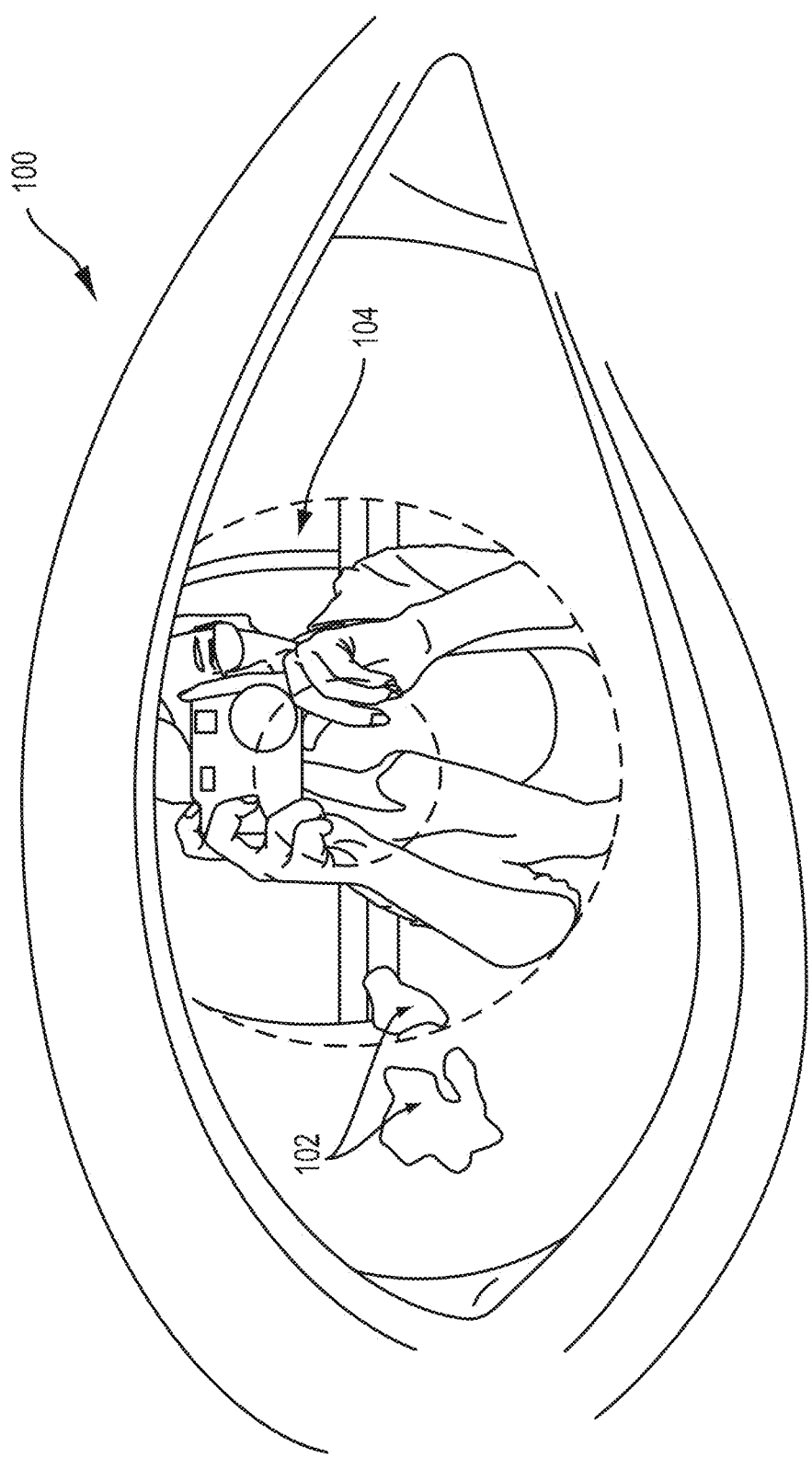
FIG. 1 illustrates reflected features that may be captured in an image of the eye, according to an exemplary embodiment.

In particular, reflections of various features in a person's environment may be captured in such images of the eye. A reflected feature may be a "glint" that results from a light source reflecting from the HMD wearer's eye. Reflected features may also result from sources (e.g., people or objects) that block light sources, and lead to dark areas in a reflected image where glints are obstructed. For example, FIG. 1 illustrates reflected features that may be captured in an image of the eye, according to an exemplary embodiment. In particular, the illustrated image of the eye 100 includes reflected features 102 and 104. Reflected features 102 may include glints that result from a light source reflecting from the surface of the eye 100. Reflected feature 104, on the other hand, is a darker feature that results from its source blocking a light source. Specifically, in the illustrated example, the source of reflected feature 104 is a person who is capturing the image of eye 100.

Further, an object in the wearer's field of view, such as camera 106, may be illuminated such that reflections from the object reflect off the eye and are distinguishable in an image of the eye. Thus, reflected features may reflections from objects in a user's environment (e.g., people, cars, etc.) or objects that block such reflections from objects.

In many cases, the location of a reflected feature's source relative to the eyes is unknown. However, there are many instances when determining the location of a reflected feature's source may be useful. Accordingly, exemplary embodiments may help to determine the locations of reflected features' sources in relation to the wearer (e.g., by determining a distance between the wearer's eye and a reflected feature).

For example, to determine the distance from the eye to a reflected feature (referred to herein as the "z-distance"), an expectation maximization process may be performed. In an exemplary embodiment, a wearable computer may initiate the expectation maximization process with the assumption that the distance to a reflected feature is infinite and that the head of the wearer is not moving substantially. (Note that the wearable computer may use a gyroscope and/or an accelerometer to verify that the wearer is not moving their head.) Further, the wearable computer may assume that the sources of the reflected features are substantially stationary (although if this assumption is made, it is possible that it may be relaxed at a later point in time). With these assumptions, the wearable computer may be configured to determine the z-distance to the source of a reflected feature by comparing an observed movement of the reflected feature on the eye to an expected movement of the reflected feature on the eye. The expected movement may be based on an estimated z-distance. Accordingly, the wearable computer may recursively adjust the estimate of the z-distance and re-determine the expected movements of the reflected features on the surface of the eye, until the observed movement of the reflected feature on the eye matches (or differs by less than a certain threshold from) the expected movement.

In a further aspect, note that using the expected movement of the reflected features on the eye to determine the corresponding z-distance to the source may involve first using the expected movements of the reflected features on the eye and a model of the eye's shape to determine an estimated movement (e.g., rotation) of the eye. The estimated movement of the eye may then be used to determine the expected movements of the reflected features on the surface of the eye. As such, the wearable computer may iteratively adjust the estimate of the z-distance and re-determine the expected movements of the reflected features on the surface of the eye (the expected movements of the reflected features being derived from a re-estimate of the movement of the eye).

II. EXEMPLARY METHODS FOR DETERMINING Z-DISTANCE TO SOURCE

Figure 2:
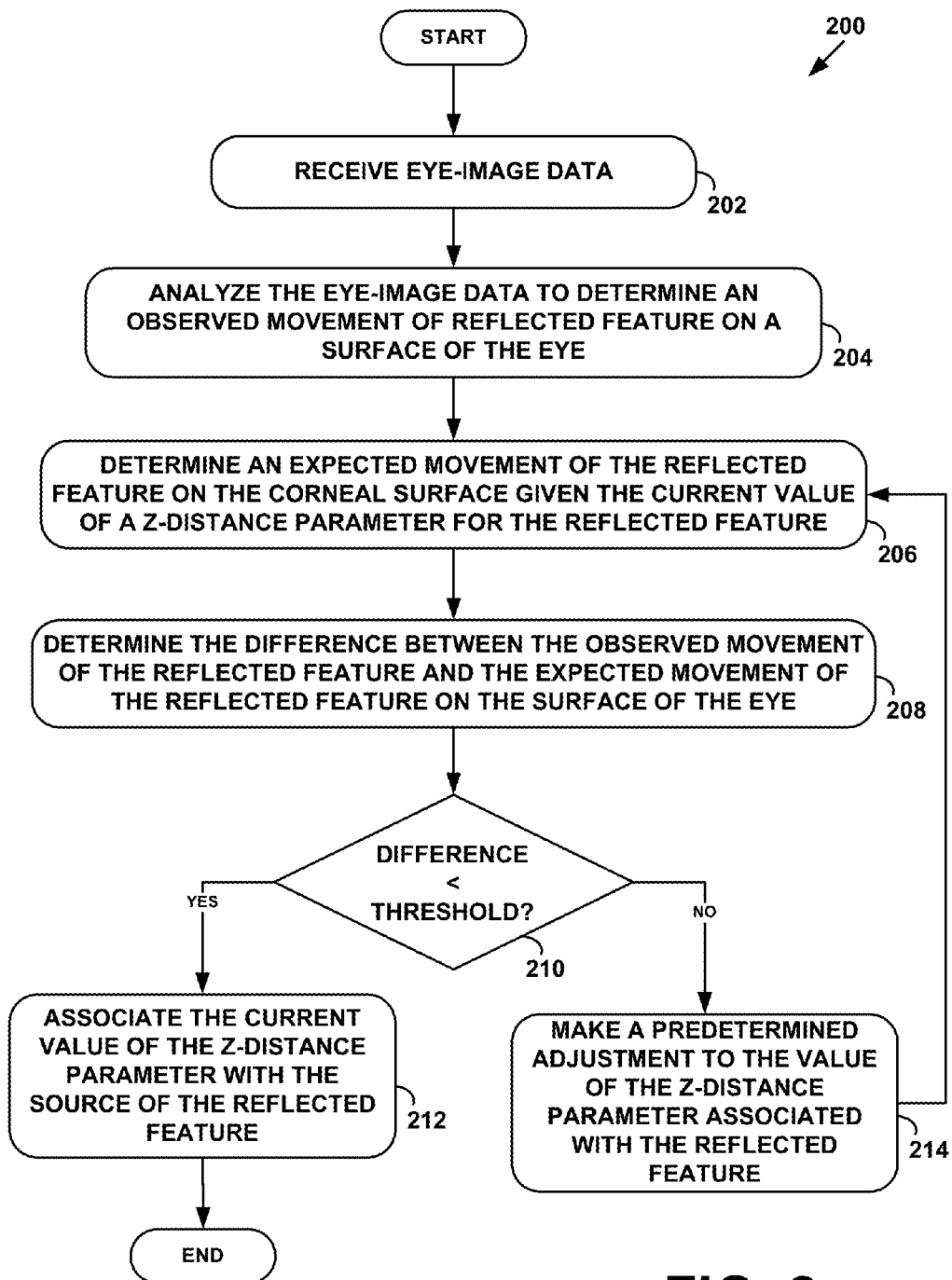
FIG. 2 is a flow chart illustrating a method, according to an exemplary embodiment.

FIG. 2 is a flow chart illustrating a method 200, according to an exemplary embodiment. Exemplary methods, such as method 200, may be carried out in whole or in part by a wearable computer having a head-mountable display with an inward-facing camera. For simplicity, a wearable computer configured as such may simply be referred to as a "head-mountable display" or "HMD" herein. Accordingly, exemplary methods may be described by way of example herein as being implemented by an HMD. However, it should be understood that an exemplary method may be implemented in whole or in part by other types of computing devices. For example, an exemplary method may be implemented in whole or in part by a server system, which receives data from a device such as an HMD. As further examples, an exemplary method may be implemented in whole or in part by a mobile phone, tablet computer, or laptop computer equipped with a camera, by a network-enabled camera, and/or by other computing devices configured to capture and/or receive eye-image data. Other examples of computing devices or combinations of computing devices that can implement an exemplary method are possible.

As shown by block 202 of FIG. 2, exemplary method 200 involves an HMD receiving eye-image data. The HMD may then analyze the eye-image data to determine an observed movement of a reflected feature on an eye surface, as shown by block 204. The HMD then determines an expected movement of the reflected feature on the eye surface based on a current value of a z-distance parameter associated with the source of the reflected feature, as shown by block 206. The value of the z-distance parameter may initially be set to a default value, which in many cases may be infinity. Once the HMD has determined the expected movement of the reflected feature on the eye surface, the HMD may determine a difference between the observed movement of the reflected feature and the expected movement of the reflected feature on the eye surface, as shown by block 208.

The HMD may then evaluate whether it has satisfactorily determined the z-distance to the source of the reflected feature, or whether it needs to further refine the z-distance. More specifically, the HMD may determine whether the difference is less than a predetermined threshold, as shown by block 210. If the difference is less than the threshold, then the HMD associates the current value of the z-distance parameter with the source of the reflected feature, as shown by block 212.

On the other hand, if the difference is greater than the threshold, then the HMD makes a predetermined adjustment to the value of the z-distance parameter, as shown by block 214. The HMD then repeats blocks 206, 208, 210, and 214 until the difference determined at block 210 is less than the threshold, at which point the HMD associates the current value of the z-distance parameter with the source of the reflected feature, as shown by block 212.

In a further aspect, an exemplary method may be repeated two or more times for the same eye-image data, in order to check whether the resulting z-distance for a given source converges to a consistent final answer. For instance, method 200 may be performed two or more times, with a different first value for the z-distance parameter each time the method is performed. As a specific example, an exemplary method could be performed three times with initial values of the z-distance parameter set at infinity, 1 cm, and 1 meter. As such, an estimated value of the z-distance parameter for a given source may be determined each time the method is performed. Accordingly, a computing device may determine whether the separately calculated values of the z-distance parameter converge.

A. Eye-Image Data

In an exemplary embodiment, the eye-image data may take various forms, and may be captured by and/or received from various devices. In some implementations, eye-image data may take the form of two or more still photographs of an eye (or a portion of the eye, such as the cornea or the iris). In other implementations, eye-image data may take the form of video of an eye. In such an implementation, two or more frames from the video may be analyzed to determine the observed movement of glints on the corneal surface. Other forms of eye-image data are also possible.

Further, images of the eye (e.g., either still images or frames from a video) may be processed so as to isolate the cornea. In this case, the eye-image data may be two or more images of the surface of the cornea, and thus may provide the corneal field-of-view (FOV) at the time when each such image is captured. Other forms of eye-image data are also possible.

B. Reflected Features

A reflected feature may also take various forms. For example, as illustrated by reflected features 102 of FIG. 1, a reflected feature may be a glint. Herein, a glint should generally be understood to be reflected light from the surface of the eye (e.g., a reflection off the cornea and/or sclera). Further, a reflected feature may be a reflection from a single light source or a reflection that combines light from two or more light sources.

Further, various types of glints exist. For example, a glint may be "controlled," which means that the glint is a reflection of light from a light source that is located at a known location. However, a glint may also be "uncontrolled" or "ambient," which means that the glint is a reflection of light from a light source at an unknown location. (Note that the terms "uncontrolled glint" and "ambient glint" are used interchangeably herein.)

Reflected features 102 in FIG. 1 are examples of ambient glints, for which the distance to the source is unknown. Note that any reflection from a light source at an unknown location may be considered an ambient glint, even if the light source itself is not an ambient light source (i.e., a light source outputting light that effects everything in the person's environment equally). As such, an ambient glint may in fact be a reflection of a point light source such as a street light, a desk lamp, or a nearby computer screen, among others.

Note that because the source of a controlled glint is known, it may be an unnecessary exercise to perform an exemplary method to determine the z-distance to the source of a controlled glint. However, this should not be interpreted to limit an exemplary method to implementations involving uncontrolled or ambient glints. In many implementations, an exemplary method may be applied equally for controlled and uncontrolled glints.

As further noted above, a reflected feature may also be a darker feature that is defined by edges where the feature blocks out glints, such as reflected feature 104 shown in FIG. 1. Such a reflected feature may be defined by a number of glints, each of which has a portion blocked out by the source object. Alternatively, such a reflected feature may result from a source object blocking out a portion of a single light source.

More generally, a reflected feature may be any aspect of a person's environment that is discernible from an image capturing reflections from the person's eye. Such a reflected feature may be identified by, for example, detecting the contrast at the edge between the feature and other reflected areas or features in the image of the eye, or by using other techniques.

C. Determining the Observed Movement of a Reflected Feature

As noted, the observed movement of a reflected feature on a surface of the eye, may be determined by analyzing, e.g., two images of the cornea that are captured at different times. For example, movement of a reflected feature on the corneal surface may be observed via a sequence of two or more corneal images. To do so, a computing system may unwarp (e.g., flatten) two or more corneal images. The computing system may then generate a feature map for the reflected feature that indicates the movement of the reflected feature between the corneal images.

Figure 3A:
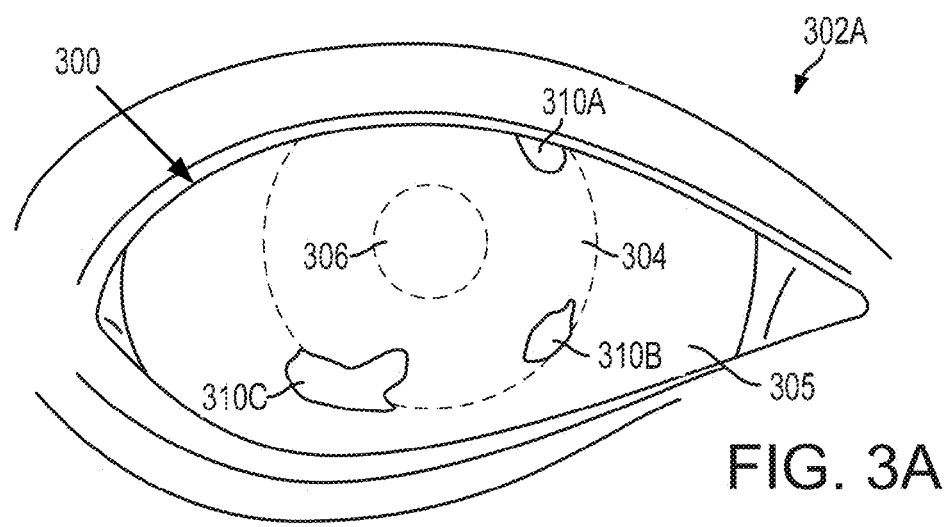
FIGS. 3A and 3B are illustrations of images of an eye, according to an exemplary embodiment.
Figure 3B:
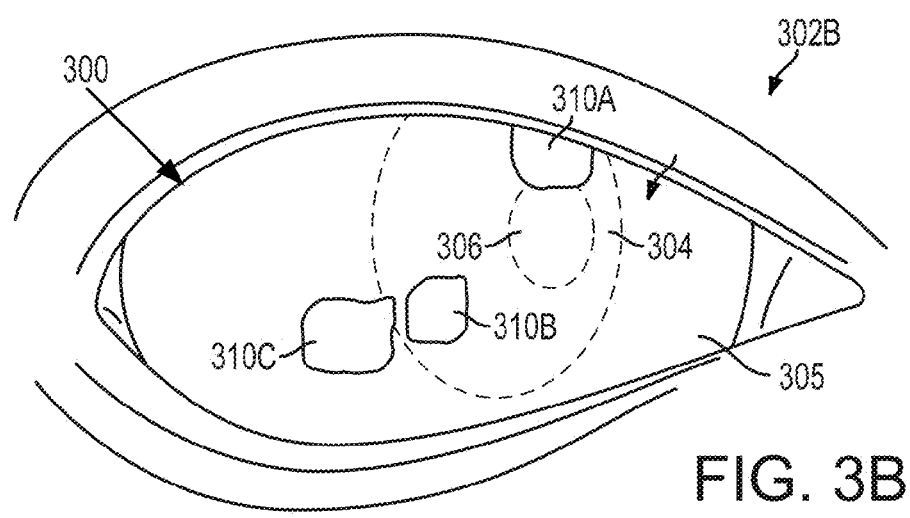

To provide an example, FIGS. 3A and 3B are illustrations of two images of an eye, according to an exemplary embodiment. More specifically, FIG. 3A shows an image 302A that includes eye 300. The image 302A includes the cornea 304, the sclera 305, and the pupil 306 of the eye 300. Image 302A also includes reflected features 310A, 310B, and 310C. FIG. 3B shows another image 302B of eye 300, which is captured at some point after image 302A. Image 302B also includes the cornea 304, the sclera 305, and the pupil 306 of the eye 300, as well as reflected features 310A, 310B, and 310C. However, in image 302B, eye 300 has moved, which in turn results in movement of reflected features 310A, 310B, and 310C on the surface of the eye 300.

The movement of reflected features 310A, 310B, and 310C on the surface of the eye 300 (e.g., on a corneal surface) may be observed by analyzing a sequence of two or more images of the eye. In the illustrated example, reflected features 310A, 310B, and 310C may change location and/or change shape (e.g., warping, stretching, and/or skewing) as they reflect from a different area of the cornea, between image 302A and image 302B. When the eye 300 moves and the source of a reflected feature remains stationary, the distance between the cornea 304 and the source of the reflected feature may change according to the curvature of the cornea 304. Furthermore, because of the curvature, the angle of reflection may change such that the reflected feature changes its shape on the corneal surface.

More specifically, the cornea 304 may act as a convex mirror, such that reflections from the eye 300 diverge after reflection. For example, FIG. 4 illustrates an image 400 of a reflection from the cornea that exhibits warping due to the curvature of the corneal surface, according to an exemplary embodiment. In image 400, the portion of reflection 402 that is reflected from the cornea exhibits a warping that is characteristic of the cornea's typical ellipsoidal shape. (Note that while there may be some variation in shape between individuals, a general ellipsoidal model of the cornea may be used. See e.g. Nayar at p. 156.) Moreover, due to the ellipsoidal shape of the cornea, divergence may vary across the cornea and/or pupil such that reflected features become enlarged the closer to the pupil the reflection is. For example, between image 302A and image 302B, reflected features 310A and 310B change shape in a manner that is typical of a reflected feature that moves towards the center of the cornea 304 (i.e., towards pupil 306). Other examples are also possible.

The change in location and/or shape of the reflected feature between images 302A and 302B may therefore represent the observed movement of the reflected features. Further, depending upon the particular implementation, different techniques may be used to quantify the observed movement of a reflected feature on the surface of the eye. While an exemplary technique will be described below, the particular technique that is utilized should not be viewed as a limitation on an exemplary method. Other techniques may be utilized without departing from the scope of the invention.

Figure 5A:
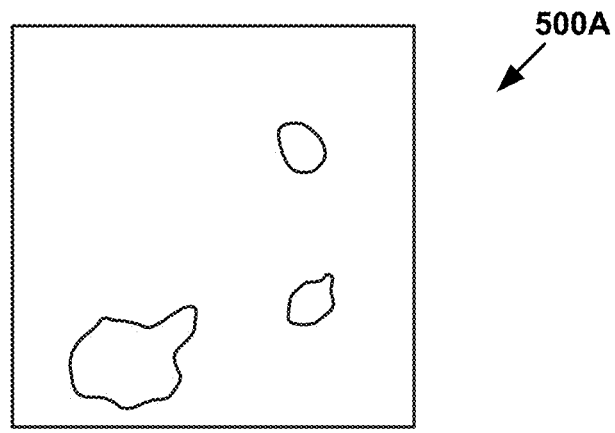
FIGS. 5A and 5B are illustrations of flattened images of the eye, according to an exemplary embodiment.
Figure 5B:
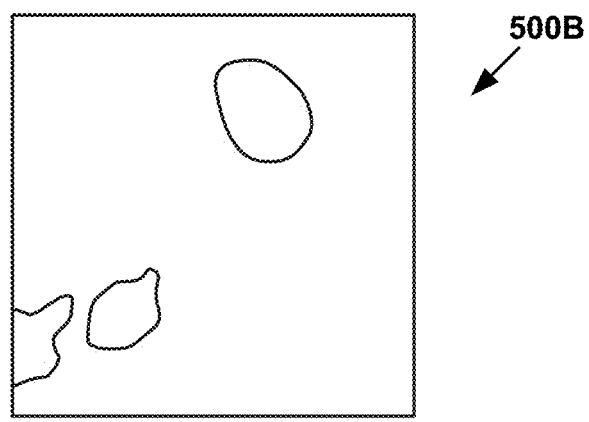

As noted generally above, the observed movement of a reflected feature may be determined by unwarping or flattening two or more images of the eye, and determining a feature map that is representative of the reflected feature's movement. Note that this process may be performed for a single reflected feature, or concurrently for multiple reflected features. For example, FIGS. 5A and 5B are illustrations of flattened images of the eye, according to an exemplary embodiment. In particular, FIG. 5A shows a flattened image 500A that may be generated by flattening image 302A, while FIG. 5B shows a flattened image 500B that may be generated by flattening image 302B.

Figure 6A:
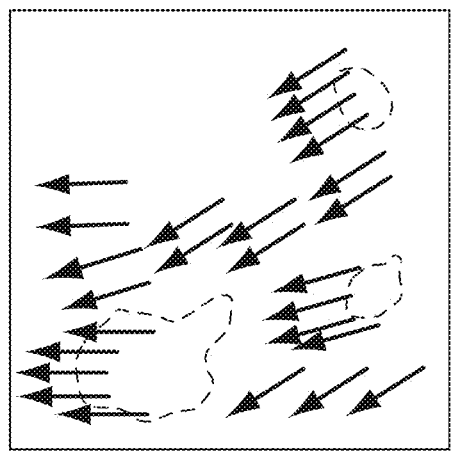
FIG. 6A is an illustration of an optical flow, according to an exemplary embodiment.

Once the two images are flattened, a feature-mapping process may be performed to quantify the movement of reflected features 310A, 310B, and 310C. More specifically, the HMD may determine the optical flow between flattened image 500A and flattened image 500B. FIG. 6A is an illustration of an optical flow, according to an exemplary embodiment. In particular, FIG. 6A shows an optical flow 600 between flattened image 500A and flattened image 500B. (Note that the optical flow 600 is for purposes of illustration and not intended to be mathematically exact.)

Figure 6B:
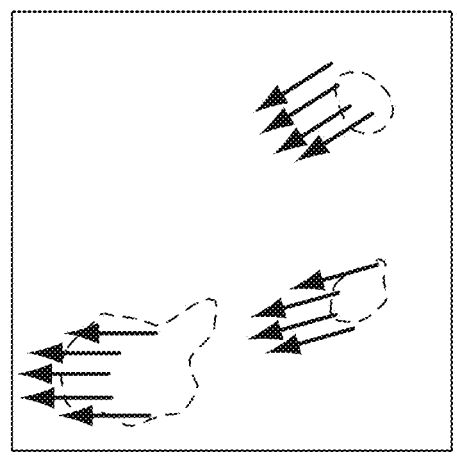
FIG. 6B is an illustration of a feature map, according to an exemplary embodiment.

Once the optical flow 600A between flattened image 500A and flattened image 500B is determined, the HMD may generate a feature map by isolating the optical flow of the reflected features. For example, FIG. 6B is an illustration of a feature map, according to an exemplary embodiment. In particular, FIG. 6B shows a feature map 602 that is based on optical flow 600. Feature map 602 thus includes the optical flow from the areas of image 302A where reflected features 310A, 310B, and 310C are located, but has substantially removed optical flow from the remaining areas of image 302A. In an exemplary embodiment, this feature map may serve as a quantitative representation of the observed movement of the reflected features 310A, 310B, and 310C.

Note that a feature map may be determined in a number of different ways. For example, while the above method first determines the optical flow between images and then isolates the optical flow in the areas of the image where reflected features are located, the reflected features may be identified before determining optical flow, such that the optical flow need only be determined for the areas of the first image in which the reflected features are located. As another alternative, an exemplary computing device may simply determine the optical flow for the entire image, without necessarily isolating the areas where the reflected features are located.

In a further aspect, note that reflected feature may also change shape (e.g., by warping, stretching, skewing, etc.) as the reflected feature moves from the cornea to the sclera. More specifically, the curvature of the sclera differs from the curvature of the cornea. Thus, viewing the cornea and the sclera as convex mirrors, the virtual image of the cornea has a shorter focal length than the virtual image of the sclera. Therefore, reflections from the cornea diverge more rapidly than reflections from the sclera. As a result of the differing divergence from the cornea and sclera, a reflected feature may change shape as it moves from the cornea to the sclera (e.g., as the eyeball moves such that at least a portion of the reflected feature that previously reflected from the cornea, then reflects from the sclera). For example, between image 302A and image 302B, reflected feature 310C changes shape in a manner that is typical of reflection moving from the cornea to the sclera.

D. Determining the Expected Movement of a Reflected Feature

As noted above, and shown in block 206 of FIG. 2, an exemplary method 200 may also involve determining an expected movement of a reflected feature, given the current estimate of the z-distance to the feature's source. A computing system may use various techniques to do so. For instance, in an exemplary embodiment, the HMD may assume that the source of a reflected feature is stationary and/or that there is no head movement between images of the eye (e.g., between image 302A and image 302B). With these assumptions, it may be inferred that the observed movement of a reflected feature occurred because of eye movement. Accordingly, a computing system may first determine an expected eye movement (e.g., by determining an expected movement of the limbus, cornea, and/or pupil), which corresponds to the observed movement of a reflected feature. The computing system may then determine the movement of a reflected feature that would be expected to occur if the expected movement of the eye occurred, given the currently-estimated z-distance to the feature's source.

As part of the function of determining the expected movement of a reflected feature, various techniques may also be used to determine the expected movement of the eye, from which the expected movement of a reflected feature can be derived. For example, the expected movement of the eye may be determined at block 206 based on (a) the observed movement of the reflected features as determined in block 204 and (b) the current value of the z-distance parameter.

Figure 7:
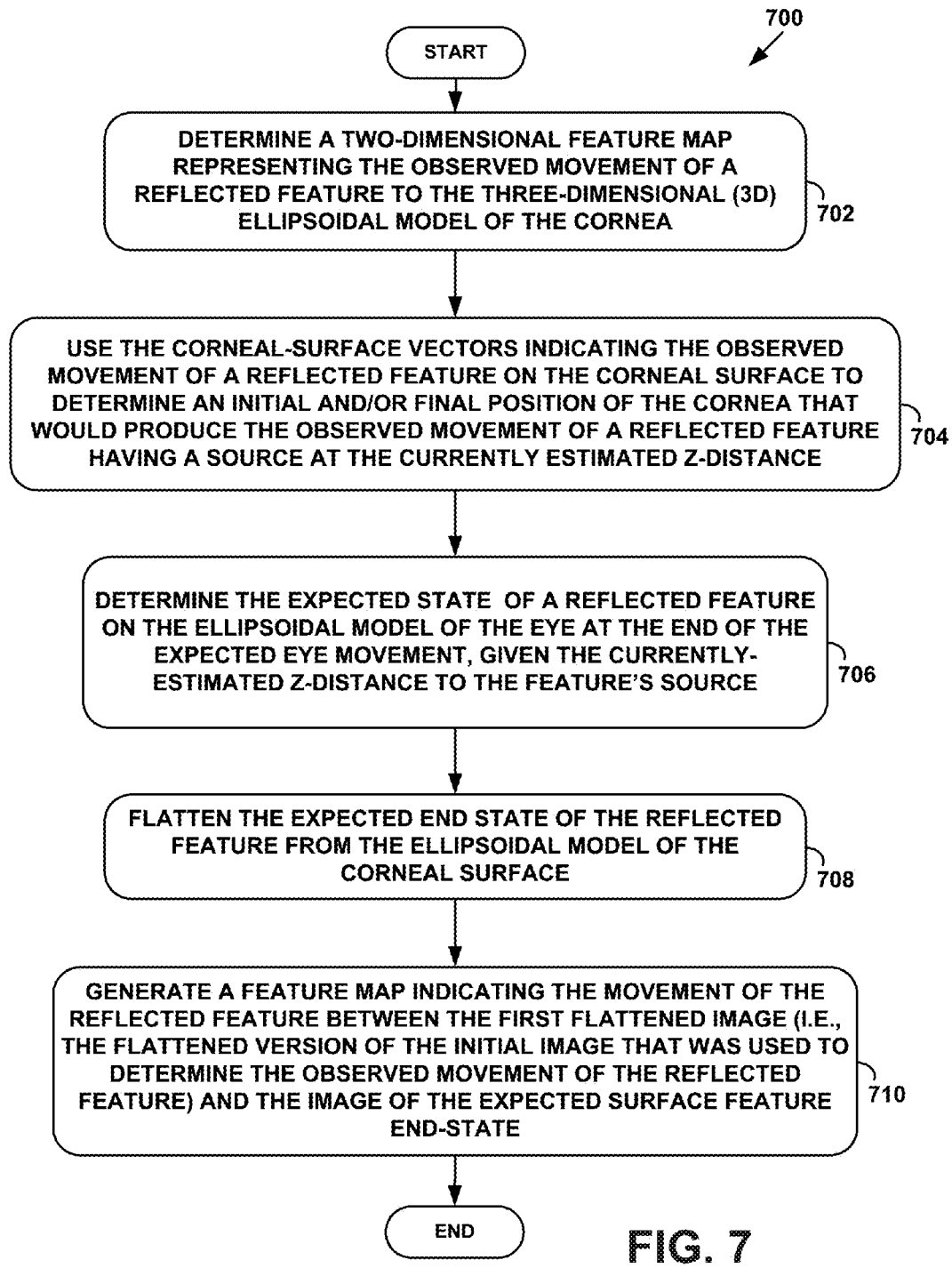
FIG. 7 is a flow chart illustrating a method for determining an expected movement of a reflected feature, according to an exemplary embodiment.

More specifically, FIG. 7 is a flow chart illustrating a method for determining an expected movement of a reflected feature, according to an exemplary embodiment. In particular, method 700 may be implemented by a computing device to determine the eye movement that would be expected to occur based on the observed movement of a reflected feature and the current estimate of its z-distance. To do so, the computing system may map a two-dimensional feature map representing the observed movement of a reflected feature to the three-dimensional (3D) ellipsoidal model of the cornea, as shown by block 702. This may involve mapping the two-dimensional vectors from the feature-mapping to the three-dimensional ellipsoidal surface. The three-dimensional vectors that are mapped to the ellipsoidal model of the corneal surface may be referred to as "corneal-surface vectors." The HMD may then use the corneal-surface vectors indicating the observed movement of a reflected feature on the corneal surface to determine an initial and/or final position of the cornea that would produce the observed movement of a reflected feature having a source at the currently estimated z-distance, as shown by block 704.

The computing system may then determine the expected state (e.g., an expected location and/or shape) of a reflected feature on the ellipsoidal model of the eye at the end of the expected eye movement, given the currently-estimated z-distance to the feature's source, as shown by block 706. Next, the computing system flattens (e.g., unwarps) the expected end state of the reflected feature from the ellipsoidal model of the corneal surface, as shown by block 708. This may be referred to as creating an image of the expected surface feature end-state. The computing system may then generate a feature map indicating the movement of the reflected feature between the first flattened image (i.e., the flattened version of the initial image that was used to determine the observed movement of the reflected feature) and the image of the expected surface feature end-state, as shown by block 710. The resulting feature map is therefore indicative of the expected movement of the reflected feature, given the current estimate of the z-distance to the feature's source.

Figure 8A:
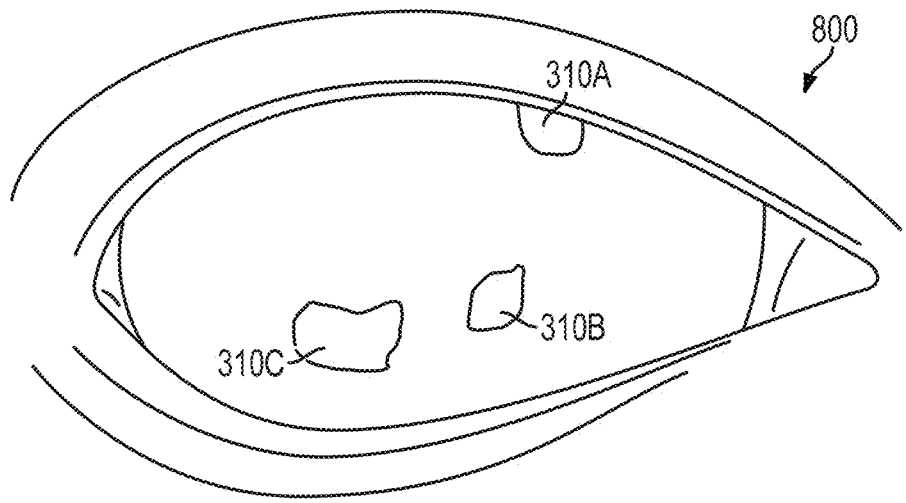
FIG. 8A shows an expected end-state image 800 of an eye, according to an exemplary embodiment.

To illustrate an application of method 700, consider that FIG. 8A shows an expected end-state image 800 of an eye, according to an exemplary embodiment. More specifically, FIG. 8A shows an expected end state 800 of reflected features 310A, 310B, and 310C on an ellipsoidal model of the corneal surface. The end state 800 of reflected features 310A, 310B, and 310C corresponds to an expected eye-movement between images 302A and 302B. Thus, the end-state 800 may be determined by determining a movement from the initial state of reflected features 310A, 310B, and 310C shown in FIG. 3A that would result from the expected movement of the cornea 304 and the currently estimate of the z-distance.

Figure 8B:
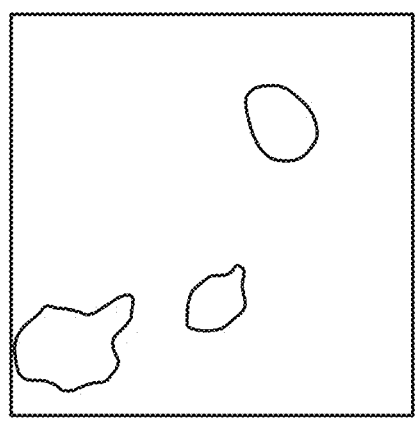
FIG. 8B is an illustration of a flattened image of the expected end state of features on the ellipsoidal model of the corneal surface, according to an exemplary embodiment.

Note that the expected end-state image 800 corresponds in time with image 302B. Accordingly, the expected end state 800 of reflected features 310A, 310B, and 310C on the three-dimensional model of the corneal surface may be flattened in a similar manner as images 302A and 302B are flattened to provide flattened images 502A and 502B, respectively. FIG. 8B is an illustration of a flattened image of the expected end state of features on the ellipsoidal model of the corneal surface, according to an exemplary embodiment. In particular, flattened image 802 may be generated from the expected end state 800 of reflected features 310A, 310B, and 310C shown in FIG. 8A. Note that while the expected end state 800 may be determined on the 3D ellipsoidal model, it is also possible that an expected end state may be derived directly as a flattened image (e.g., such as flattened image 802 of FIG. 8B).

Figure 8C:
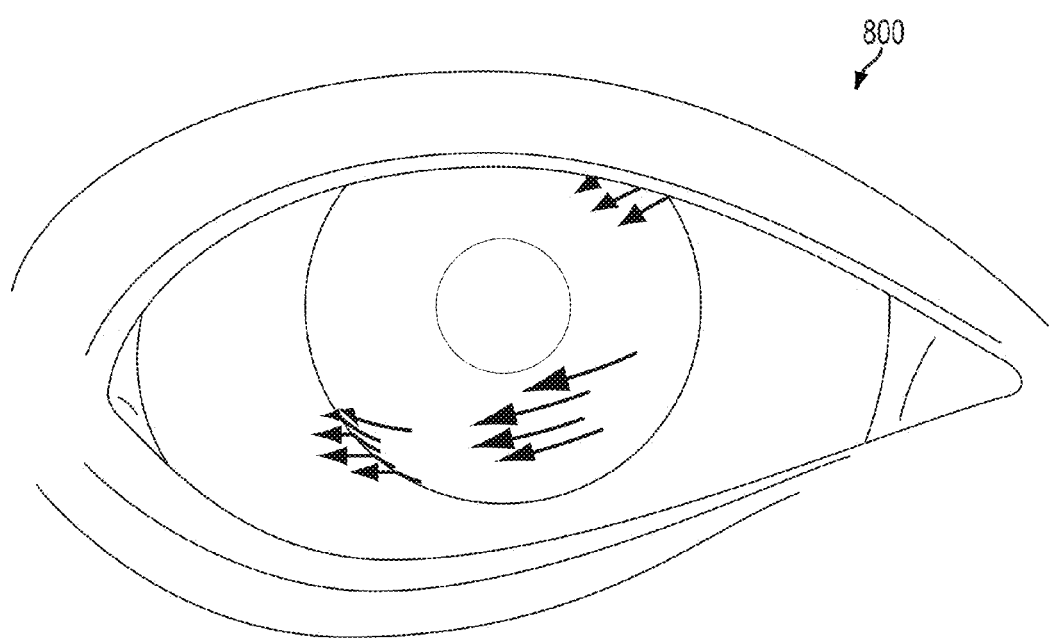
FIG. 8C illustrates a feature-mapping between the flattened image shown in FIG. 5A and the flattened image shown in FIG. 8A.

Given the flattened image 802, the HMD may generate a feature-map for the reflected features 310A, 310B, and 310C, between flattened image 502A and flattened image 800. FIG. 8C illustrates a feature-mapping between the flattened image 502A shown in FIG. 5A and the flattened image 802 shown in FIG. 8A. This feature mapping may therefore provide a measure of the expected movement of reflected features 310A, 310B, and 310C, given the currently-estimated z-distances to the respective sources of these features.

In a further aspect, when optical flow and/or feature mapping is utilized, the wearable computer may effectively be estimating of the relative movement of the eye. In other implementations, the wearable computer may instead determine an absolute ending position (e.g., end state) of the eye after undergoing the determined amount of eye movement from a known position (e.g., a known start state). To do so, a computing device may apply structure from motion processes (or techniques derived from such processes).

E. Recursively Refining the Value of the Z-Distance Parameter

When the z-distance to the source of a reflected feature is correct, the expected movement of a reflected feature should be the same as or very close to the observed movement of the reflected feature. Thus, as illustrated by blocks 208 to 214 of method 200, once an HMD has determined both the observed movement and the expected movement of a reflected feature, the HMD may determine whether the difference between the observed movement and the expected movement is small enough to set the value of the z-distance parameter for the reflected feature's source at the currently-estimated value. If the difference is too great (e.g., greater than a threshold difference), then the HMD may adjust the value of the z-distance parameter for the reflected feature's source and repeat this process recursively until the difference is determined to be less than the threshold difference. This recursive process may be viewed as an expectation maximization process to determine the z-distance to the source of a reflected feature.

As part of such a process, when there is more than a threshold distance between the observed and expected movement of a reflected feature, the computing device may determine an amount by which to adjust the value of the z-distance parameter. To do so, a computing system may initially set the value of the z-distance parameter to first value. For instance, the z-distance parameter for a given source may initially be set to infinity. Then, when there is more than a threshold distance between the observed and expected movement of a reflected feature, the computing device may determine a z-distance value that would have caused the expected movement to equal the observed movement. The computing device may then determine the size of the gap between the current value of the z-distance parameter that would have caused the expected movement to equal the observed movement.

In an exemplary embodiment, the computing device may adjust the value by less than the amount that would have caused the expected movement to equal the observed movement. For example, the value of the z-distance parameter may be adjusted by between 5% and 10% of difference. Other examples are also possible. By adjusting the value of the z-distance parameter gradually, an exemplary method may help to avoid a situation where the adjustment overshoots the required adjustment and potentially prevents successful assessment of the z-distance. However, it should be understood that an exemplary method is not limited to any particular adjustment to the z-distance parameter.

F. Concurrently Determining Z-Distances for Sources of Multiple Reflected Features In some applications, an exemplary method, such as method 200, may be carried out for a single reflected feature. However, in other applications, an exemplary method 200 may be implemented to simultaneously determine the respective source location for each of two or more features that were reflected from the same eye. For example, referring to FIGS. 3A and 3B, an exemplary method may be utilized to simultaneously determine the source location for each of reflected features 310A, 310B, and 310C.

More specifically, to concurrently determine the different source locations of a number of reflected features, a separate z-distance parameter may be defined for the source of each reflected feature. To do so, the HMD may first analyze the first image 302A of the eye to identify the reflected features that are in the image. The feature mapping may then be generated that indicates the optical flow of each reflected feature from the first corneal image 302A to the second corneal image 302B. The feature mapping may therefore provide a measure of the observed movement for each reflected feature.

Next, the two-dimensional feature map may be re-mapped to the 3D ellipsoidal model of the corneal surface. As such, the mapping of the observed movement to the corneal surface may then be used to determine the expected eye-movement that corresponds to the observed movements of all reflected features, given the respective value of the z-distance parameter for each feature's source.

Further, since the HMD is making parallel determinations the source locations for a number of reflected features, the HMD may determine the expected movement of each reflected feature individually, based on the z-parameter of each feature's source. For example, the expected movement may be determined for each of reflected features 310A, 310B and 310C, based on the respective z-parameter value for each. The individually-determined expected movements of the reflected features 310A, 310B and 310C may then be mapped on to the corneal surface model, and the corneal surface model may then be flattened for comparison to the flattened version of the first image 302B.

The difference between the observed movement and the expected movement may then be separately determined for each reflected feature. In particular, the HMD may separately compare (a) the optical flow between the flattened version of the first observed image 502A and the flattened version of the second observed image 502B (i.e., the observed movement of the reflected feature) to (b) the optical flow between the flattened version of the first observed image 502A and the flattened version of the expected end state image (i.e., the expected movement of the reflected feature), for each reflected feature to determine, for each reflected feature, the difference between the observed movement and the expected movement. Thus, the HMD may recursively iterate through the process until the respectively-determined differences are less than the threshold for all reflected features.

Note that since the z-distances are separately evaluated for each reflected feature, but may be evaluated in parallel, an exemplary method may set z-distance parameter for reflected features at different times (i.e., some z-distances may be less than threshold on an earlier iteration through the expectation maximization process than others). Further, when z-distances for multiple sources are adjusted on a given iteration of the process, some or all of the z-distance parameters may be adjusted in a different manner than one another. For example, the z-distance for a source that is determined to be the most inaccurate may be adjusted so as to reduce the difference between the observed and expected movement by 10%, while the z-distance for sources of other reflected features may be adjusted so as to reduce the respective differences between the respective observed and expected movements by 5%. Other techniques for adjusting multiple z-distance parameters concurrently are also possible.

In a further aspect, exemplary methods may initially assume that sources of reflected features (e.g., objects and/or light sources) are stationary. However, in practice there may be moving sources in a person's environment, and the reflected features resulting from these sources may thus be affected by the movement of the sources. In this scenario, an exemplary method may determine which sources are moving by, e.g., comparing eye-movement estimates corresponding to individual reflected features and determining reflected features for which the expected eye-movement deviates by more than a threshold amount (e.g., statistical outliers). Such reflected features may then be ignored. Alternatively, the motion of the corresponding sources may be compensated for by determining and adjusting according to the motion of such a reflected feature relative to stationary reflected features.

In a further aspect, there may be scenarios where it is difficult to distinguish between a reflected feature corresponding to a small movement of the eye with a source nearby, which typically causes the corresponding reflected feature(s) to move significantly on the surface of the eye, and a reflected feature corresponding to a large movement of the eye with a source object that is effectively at infinity, based on a single reflected feature. However, applying an exemplary method that utilizes multiple reflected features may help make such a distinction.

Specifically, in many situations, ambient glints may be far (e.g., greater than 10 feet) from the eye. If multiple ambient glints are present, it is highly likely that at least one will be far from the eye. Thus, if the large movement in a given ambient glint corresponds to a small eye movement of a nearby light source, the other glint movements of the more distant sources would still be relatively small. However, if all ambient glint movements are large, this may be taken to mean that either the eye is moving significantly, or all ambient glint sources are close to the eye. In the latter case, the difference could still be detected from the observation that the relative movements of the ambient glints, are diverging from one another (since the high curvature area of the cornea moves more between the ambient glints). Alternatively, another technique for disambiguating this situation may involve tracking the pupil, limbus, and/or sclera directly, to determine if the general magnitude of eye movement (e.g., relatively large or small).

G. Detecting Reflected Features in an Image of the Eye

In a further aspect of an exemplary method, an initial process may be performed to identify reflected features a reflection from an eye. For example, a histogram of oriented gradients (HOGs) may be determined for a reflected image. The HOG may be evaluated for highlights and/or lowlights in order to determine areas of the image where reflected features exist. Additionally or alternatively, an HMD may employ various object recognition techniques to determine where reflected features are located in an image. Other techniques for identifying reflected features in an image of the eye are also possible.

H. Embodiments that Utilize Reflections from Both Eyes

In a further aspect, some embodiments may utilize reflected features from an image or images of both of a person's eyes. In particular, those of ordinary skill in the art will understand, after reading the disclosure herein, how described systems and methods may be extended to utilize images of ambient glints from both eyes to determine and/or refine the estimated z-distance to objects. Specifically, since the typical interpupillary distance for adults is typically 54-68 mm, ambient glints from the one eye may provide a slightly different information about a person's environment than ambient glints from the other eye. Thus, apply stereo computer-vision techniques to the techniques described herein, the relative position of the ambient glints with respect to each other can provide two independent estimates of the z-distance to the source of the glint. The independent estimates may be weighted in the iterative estimation process to help improve the estimation of z-distance the determination of the expected movements of the reflected features on the surface of the eye.

IV. EXEMPLARY WEARABLE COMPUTING DEVICES

Systems and devices in which exemplary embodiments may be implemented will now be described in greater detail. In general, an exemplary system may be implemented in or may take the form of a wearable computer. However, an exemplary system may also be implemented in or take the form of other devices, such as a mobile phone, among others. Further, an exemplary system may take the form of non-transitory computer readable medium, which has program instructions stored thereon that are executable by at a processor to provide the functionality described herein. An exemplary, system may also take the form of a device such as a wearable computer or mobile phone, or a subsystem of such a device, which includes such a non-transitory computer readable medium having such program instructions stored thereon.

Figure 9A:
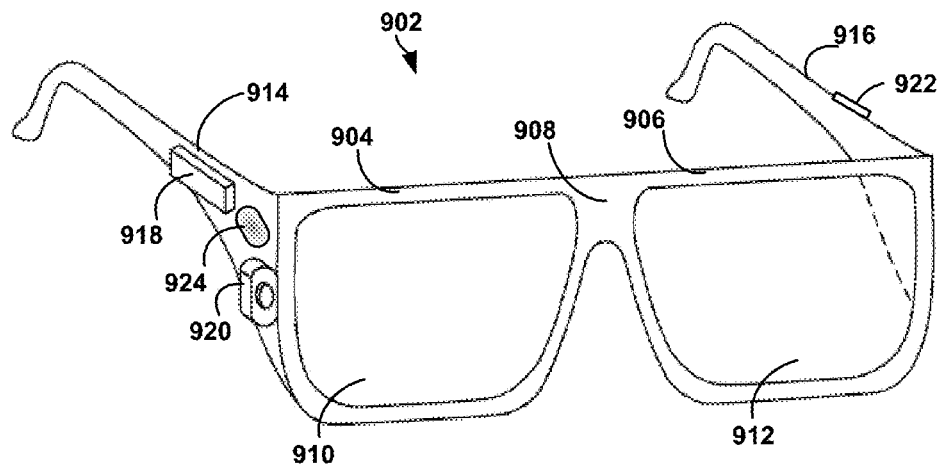
FIG. 9A illustrates a wearable computing system according to an exemplary embodiment.

FIG. 9A illustrates a wearable computing system according to an exemplary embodiment. In FIG. 9A, the wearable computing system takes the form of a head-mounted device (HMD) 902 (which may also be referred to as a head-mounted display). It should be understood, however, that exemplary systems and devices may take the form of or be implemented within or in association with other types of devices, without departing from the scope of the invention. As illustrated in FIG. 9A, the head-mounted device 902 comprises frame elements including lens-frames 904, 906 and a center frame support 908, lens elements 910, 912, and extending side-arms 914, 916. The center frame support 908 and the extending side-arms 914, 916 are configured to secure the head-mounted device 902 to a user's face via a user's nose and ears, respectively.

Each of the frame elements 904, 906, and 908 and the extending side-arms 914, 916 may be formed of a solid structure of plastic and/or metal, or may be formed of a hollow structure of similar material so as to allow wiring and component interconnects to be internally routed through the head-mounted device 902. Other materials may be possible as well.

One or more of each of the lens elements 910, 912 may be formed of any material that can suitably display a projected image or graphic. Each of the lens elements 910, 912 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 914, 916 may each be projections that extend away from the lens-frames 904, 906, respectively, and may be positioned behind a user's ears to secure the head-mounted device 902 to the user. The extending side-arms 914, 916 may further secure the head-mounted device 902 to the user by extending around a rear portion of the user's head. Additionally or alternatively, for example, the HMD 902 may connect to or be affixed within a head-mounted helmet structure. Other possibilities exist as well.

The HMD 902 may also include an on-board computing system 918, a video camera 920, a sensor 922, and a finger-operable touch pad 924. The on-board computing system 918 is shown to be positioned on the extending side-arm 914 of the head-mounted device 902; however, the on-board computing system 918 may be provided on other parts of the head-mounted device 902 or may be positioned remote from the head-mounted device 902 (e.g., the on-board computing system 918 could be wire- or wirelessly-connected to the head-mounted device 902). The on-board computing system 918 may include a processor and memory, for example. The on-board computing system 918 may be configured to receive and analyze data from the video camera 920 and the finger-operable touch pad 924 (and possibly from other sensory devices, user interfaces, or both) and generate images for output by the lens elements 910 and 912.

The video camera 920 is shown positioned on the extending side-arm 914 of the head-mounted device 902; however, the video camera 920 may be provided on other parts of the head-mounted device 902. The video camera 920 may be configured to capture images at various resolutions or at different frame rates. Many video cameras with a small form-factor, such as those used in cell phones or webcams, for example, may be incorporated into an example of the HMD 902.

Further, although FIG. 9A illustrates one video camera 920, more video cameras may be used, and each may be configured to capture the same view, or to capture different views. For example, the video camera 920 may be forward facing to capture at least a portion of the real-world view perceived by the user. This forward facing image captured by the video camera 920 may then be used to generate an augmented reality where computer generated images appear to interact with the real-world view perceived by the user.

The sensor 922 is shown on the extending side-arm 916 of the head-mounted device 902; however, the sensor 922 may be positioned on other parts of the head-mounted device 902. The sensor 922 may include one or more of a gyroscope or an accelerometer, for example. Other sensing devices may be included within, or in addition to, the sensor 922 or other sensing functions may be performed by the sensor 922.

The finger-operable touch pad 924 is shown on the extending side-arm 914 of the head-mounted device 902. However, the finger-operable touch pad 924 may be positioned on other parts of the head-mounted device 902. Also, more than one finger-operable touch pad may be present on the head-mounted device 902. The finger-operable touch pad 924 may be used by a user to input commands. The finger-operable touch pad 924 may sense at least one of a position and a movement of a finger via capacitive sensing, resistance sensing, or a surface acoustic wave process, among other possibilities. The finger-operable touch pad 924 may be capable of sensing finger movement in a direction parallel or planar to the pad surface, in a direction normal to the pad surface, or both, and may also be capable of sensing a level of pressure applied to the pad surface. The finger-operable touch pad 924 may be formed of one or more translucent or transparent insulating layers and one or more translucent or transparent conducting layers. Edges of the finger-operable touch pad 924 may be formed to have a raised, indented, or roughened surface, so as to provide tactile feedback to a user when the user's finger reaches the edge, or other area, of the finger-operable touch pad 924. If more than one finger-operable touch pad is present, each finger-operable touch pad may be operated independently, and may provide a different function.

Figure 9B:
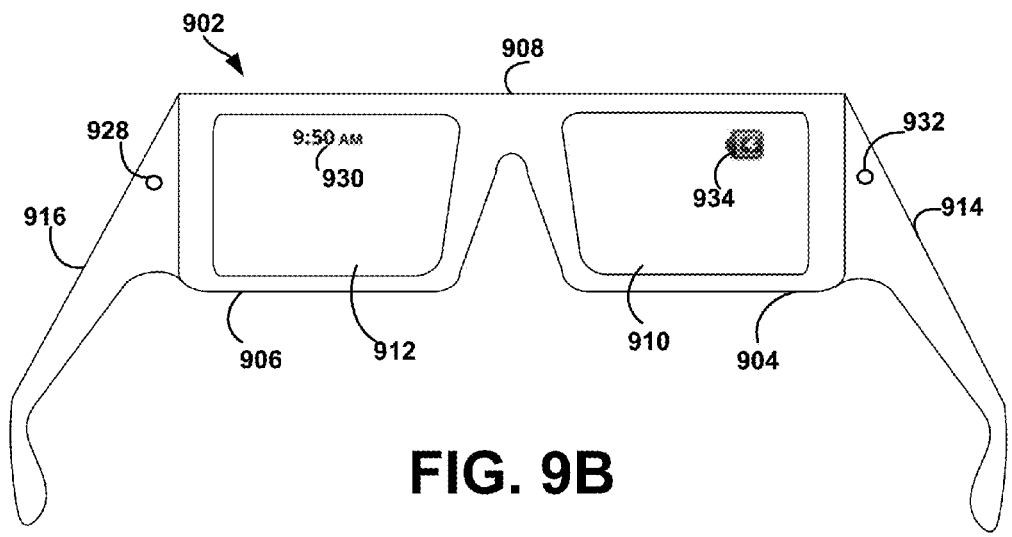
FIG. 9B illustrates an alternate view of the wearable computing device illustrated in FIG. 9A.

FIG. 9B illustrates an alternate view of the wearable computing device illustrated in FIG. 9A. As shown in FIG. 9B, the lens elements 910, 912 may act as display elements. The head-mounted device 902 may include a first projector 928 coupled to an inside surface of the extending side-arm 916 and configured to project a display 930 onto an inside surface of the lens element 912. Additionally or alternatively, a second projector 932 may be coupled to an inside surface of the extending side-arm 914 and configured to project a display 934 onto an inside surface of the lens element 910.

The lens elements 910, 912 may act as a combiner in a light projection system and may include a coating that reflects the light projected onto them from the projectors 928, 932. In some embodiments, a reflective coating may not be used (e.g., when the projectors 928, 932 are scanning laser devices).

In alternative embodiments, other types of display elements may also be used. For example, the lens elements 910, 912 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 904, 906 for driving such a matrix display. Alternatively or additionally, a laser or LED source and scanning system could be used to draw a raster display directly onto the retina of one or more of the user's eyes. Other possibilities exist as well.

Figure 9C:
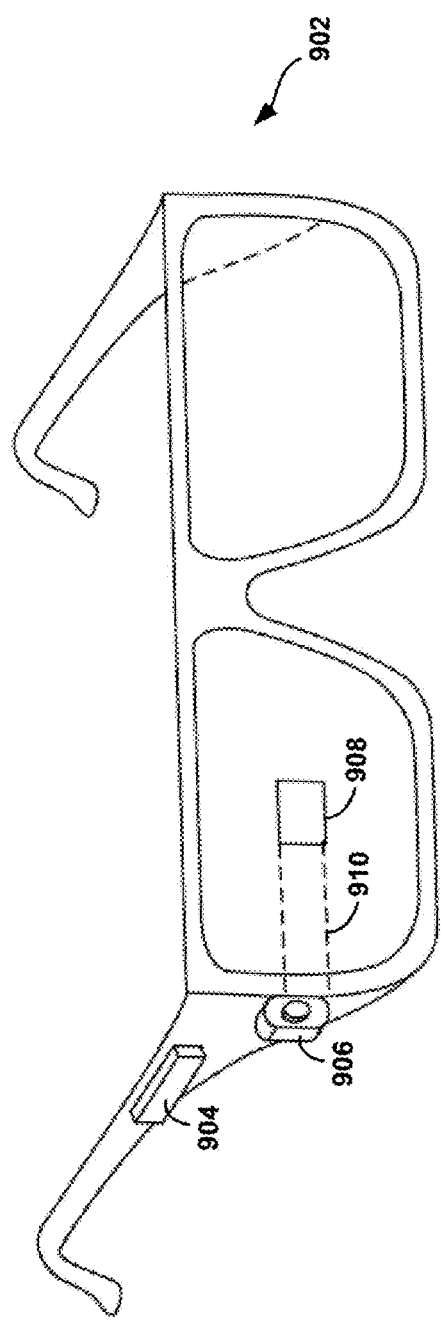
FIG. 9C illustrates another wearable computing system according to an exemplary embodiment.

FIG. 9C illustrates another wearable computing system according to an exemplary embodiment, which takes the form of an HMD 952. The HMD 952 may include frame elements and side-arms such as those described with respect to FIGS. 9A and 9B. The HMD 952 may additionally include an on-board computing system 954 and a video camera 206, such as those described with respect to FIGS. 9A and 9B. The video camera 206 is shown mounted on a frame of the HMD 952. However, the video camera 206 may be mounted at other positions as well.

As shown in FIG. 9C, the HMD 952 may include a single display 958 which may be coupled to the device. The display 958 may be formed on one of the lens elements of the HMD 952, such as a lens element described with respect to FIGS. 9A and 9B, and may be configured to overlay computer-generated graphics in the user's view of the physical world. The display 958 is shown to be provided in a center of a lens of the HMD 952, however, the display 958 may be provided in other positions. The display 958 is controllable via the computing system 954 that is coupled to the display 958 via an optical waveguide 960.

Figure 9D:
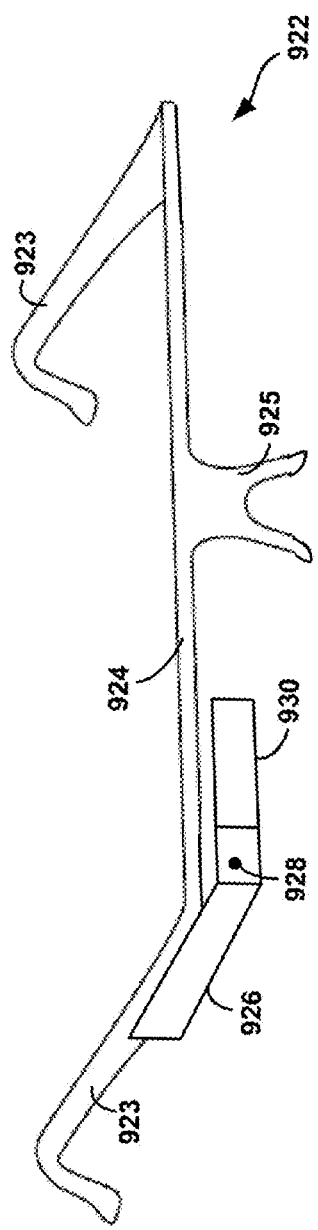
FIG. 9D illustrates another wearable computing system according to an exemplary embodiment.

FIG. 9D illustrates another wearable computing system according to an exemplary embodiment, which takes the form of an HMD 972. The HMD 972 may include side-arms 973, a center frame support 974, and a bridge portion with nosepiece 975. In the example shown in FIG. 9D, the center frame support 974 connects the side-arms 973. The HMD 972 does not include lens-frames containing lens elements. The HMD 972 may additionally include an on-board computing system 976 and a video camera 978, such as those described with respect to FIGS. 9A and 9B.

The HMD 972 may include a single lens element 980 that may be coupled to one of the side-arms 973 or the center frame support 974. The lens element 980 may include a display such as the display described with reference to FIGS. 9A and 9B, and may be configured to overlay computer-generated graphics upon the user's view of the physical world. In one example, the single lens element 980 may be coupled to the inner side (i.e., the side exposed to a portion of a user's head when worn by the user) of the extending side-arm 973. The single lens element 980 may be positioned in front of or proximate to a user's eye when the HMD 972 is worn by a user. For example, the single lens element 980 may be positioned below the center frame support 974, as shown in FIG. 9D.

Figure 10:
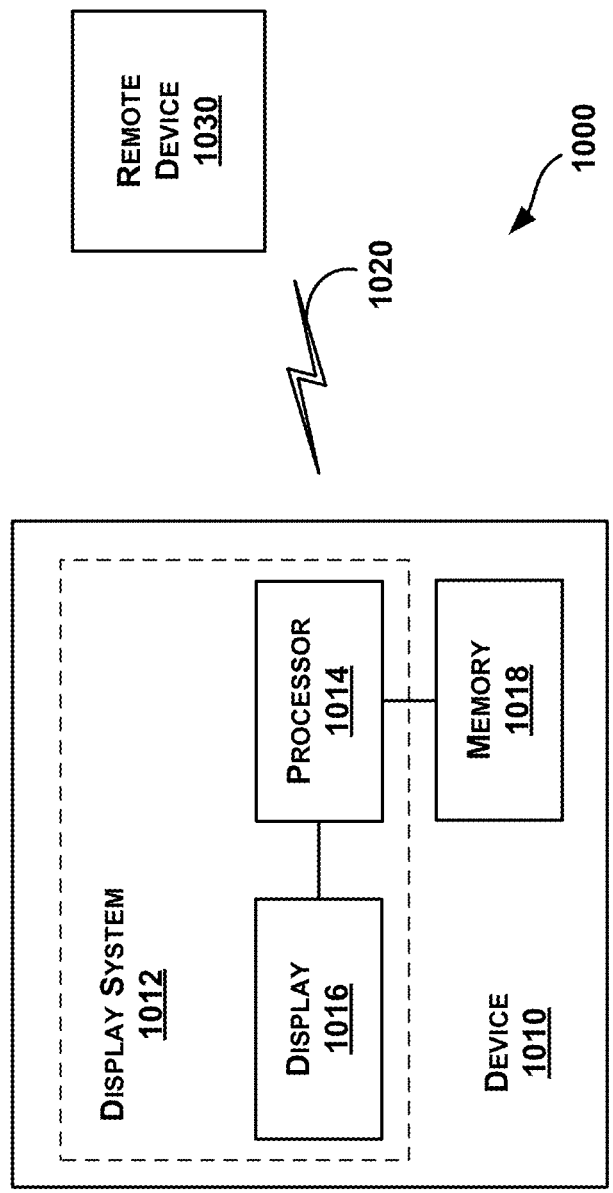
FIG. 10 illustrates a schematic drawing of a computing device according to an exemplary embodiment.

FIG. 10 illustrates a schematic drawing of a computing device according to an exemplary embodiment. In system 1000, a device 1010 communicates using a communication link 1020 (e.g., a wired or wireless connection) to a remote device 1030. The device 1010 may be any type of device that can receive data and display information corresponding to or associated with the data. For example, the device 1010 may be a heads-up display system, such as the head-mounted devices 902, 952, or 972 described with reference to FIGS. 9A-9D.

Thus, the device 1010 may include a display system 1012 comprising a processor 1014 and a display 1016. The display 1010 may be, for example, an optical see-through display, an optical see-around display, or a video see-through display. The processor 1014 may receive data from the remote device 1030, and configure the data for display on the display 1016. The processor 1014 may be any type of processor, such as a micro-processor or a digital signal processor, for example.

The device 1010 may further include on-board data storage, such as memory 1018 coupled to the processor 1014. The memory 1018 may store software that can be accessed and executed by the processor 1014, for example.

The remote device 1030 may be any type of computing device or transmitter including a laptop computer, a mobile telephone, or tablet computing device, etc., that is configured to transmit data to the device 1010. The remote device 1030 and the device 1010 may contain hardware to enable the communication link 1020, such as processors, transmitters, receivers, antennas, etc.

In FIG. 10, the communication link 1020 is illustrated as a wireless connection; however, wired connections may also be used. For example, the communication link 1020 may be a wired serial bus such as a universal serial bus or a parallel bus. A wired connection may be a proprietary connection as well. The communication link 1020 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 1030 may be accessible via the Internet and may include a computing cluster associated with a particular web service (e.g., social-networking, photo sharing, address book, etc.).

V. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:
1. A method comprising:
  (a) analyzing eye-image data to determine observed movement of a reflected feature on a corneal surface;
  (b) determining an expected movement of the reflected feature on the corneal surface given a value of a z-distance parameter, wherein the value of the z-distance parameter is initially set at a first value;
  (c) determining a difference between the observed movement of the reflected feature on the corneal surface and the expected movement of the reflected feature on the corneal surface;
  (d) if the difference is less than a threshold, then associating the value of the z-distance parameter with a source of the reflected feature; and
  (e) if the difference is greater than the threshold, then:
    (i) making a predetermined adjustment to the value of the z-distance parameter; and
    (ii) repeating (a) to (d) with the adjusted value of the z-distance parameter.

2. The method of claim 1, further comprising concurrently performing the method of claim 1 for a plurality of reflected features in the corneal image.

3. The method of claim 1, wherein the reflected feature is an ambient glint.

4. The method of claim 1, wherein the reflected feature is defined at least in part by an ambient glint.

5. The method of claim 1, wherein the default estimate value of the z-distance parameter is infinity.

6. The method of claim 1, wherein the predetermined adjustment to the value of the z-distance parameter comprises a five to ten percent adjustment to the value of the z-distance parameter.

7. The method of claim 1, further comprising, initially receiving the corneal imaging, wherein the corneal imaging comprises at least a first corneal image and a second corneal image.

8. The method of claim 7, further comprising:
determining a histogram of oriented gradients (HOG) based on at least the first corneal image; and
analyzing the HOG to identify the ambient glint within the first corneal image.

9. The method of claim 7, wherein determining the observed movement of the ambient glint comprises:
flattening both the first corneal image and the second corneal image; an
determining movement of the ambient glint between the flattened first corneal image and the flattened second corneal image.

10. The method of claim 9, wherein determining the movement of the ambient glint between the flattened first corneal image and the flattened second corneal image comprises determining a feature-mapping between the flattened first corneal image and the flattened second corneal image, wherein the feature-mapping is mapped to the model of the corneal surface.

11. The method of claim 9, wherein determining the movement of the ambient glint between the flattened first corneal image and the flattened second corneal image comprises determining optical flow between the flattened first corneal image and the flattened second corneal image, wherein the optical flow is mapped to the model of the corneal surface.

12. The method of claim 1, further comprising:
determining an expected eye movement corresponding to the observed movement of the ambient glint in the corneal image;
wherein the expected movement of the ambient glint is further based on the expected eye movement corresponding to the observed movement of the ambient glint in the corneal image.

13. The method of claim 1, wherein the method is carried out at least in part by a head-mounted display having an inward-facing camera, wherein the method further comprises the inward-facing camera capturing the corneal imaging.

14. The method of claim 1, wherein the method is carried out at least in part by a server system, wherein the method further comprising the server system receiving the corneal imaging from a client device.

15. The method of claim 14, wherein the client device comprises a head-mounted display having an inward-facing camera.

16. The method of claim 1, further comprising:
performing the method of claim 1 two or more times for the same eye-image data, wherein a different first value for the z-distance parameters is utilized each time the method is performed, wherein a respective value of the z-distance parameter is associated with the reflected feature each time the method is performed with a different first value; and
determining whether the respective values of the z-distance parameter that are associated with the reflected feature converge.

17. A system comprising:
a non-transitory computer-readable medium; and
program instructions stored on the non-transitory computer-readable medium and executable by at least one processor to:
(a) analyze eye-image data to determine observed movement of an ambient glint on a corneal surface;
(b) determine an expected movement of the ambient glint on the corneal surface given a value of a z-distance parameter, wherein the value of the z-distance parameter is initially set at a default estimate value;
(c) determine a difference between the observed movement of the ambient glint on the corneal surface and the expected movement of the ambient glint on the corneal surface;
(d) if the difference is less than a threshold, then associate the value of the z-distance parameter with a source of the ambient glint; and
(e) if the difference is greater than the threshold, then:
(i) make a predetermined adjustment to the value of the z-distance parameter; and
(ii) repeat (a) to (d) with the adjusted value of the z-distance parameter.

18. The system of claim 17, wherein the system further comprises program instructions stored on the non-transitory computer-readable medium and executable by at least one processor to receive the eye-image data, wherein the eye-image data is captured by an inward-facing camera on a head-mountable computing device.

19. A non-transitory computer readable medium having stored therein instructions executable by a computing device to cause the computing device to perform functions comprising:
(a) analyzing eye-image data to determine observed movement of a reflected feature on a corneal surface;
(b) determining an expected movement of the reflected feature on the corneal surface given a value of a z-distance parameter, wherein the value of the z-distance parameter is initially set at a first value;
(c) determining a difference between the observed movement of the reflected feature on the corneal surface and the expected movement of the reflected feature on the corneal surface;
(d) if the difference is less than a threshold, then associating the value of the z-distance parameter with a source of the reflected feature; and
(e) if the difference is greater than the threshold, then:
(i) making a predetermined adjustment to the value of the z-distance parameter; and
(ii) repeating (a) to (d) with the adjusted value of the z-distance parameter.

20. The non-transitory computer readable medium of claim 19, wherein the functions further comprise concurrently performing functions (a) to (e) for a plurality of reflected features in the corneal image.

21. The non-transitory computer readable medium of claim 19, wherein the reflected feature is an ambient glint.

* * * * *